(12) United States Patent
Chen et al.

(10) Patent No.: US 6,646,979 B1
(45) Date of Patent: Nov. 11, 2003

(54) METHODS OF DYNAMICALLY ASSIGNING CHANNEL CODES OF DIFFERENT LENGTHS IN WIRELESS COMMUNICATION SYSTEMS

(75) Inventors: Tai-Ann Chen, Parsippany, NJ (US); Wen-Yi Kuo, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/448,808

(22) Filed: Nov. 24, 1999

Related U.S. Application Data

(60) Provisional application No. 60/115,511, filed on Jan. 11, 1999.

(51) Int. Cl.[7] ............................................. H04J 11/00
(52) U.S. Cl. ...................... 370/208; 370/441; 375/134
(58) Field of Search ................................ 370/203, 208, 370/209, 335, 341, 441, 468, 320, 342; 375/130, 134, 238, 336, 334

(56) References Cited

U.S. PATENT DOCUMENTS

| | | | |
|---|---|---|---|
| 5,103,459 A | * | 4/1992 | Gilhousen et al. .......... 370/441 |
| 5,930,230 A | * | 7/1999 | Odenwalder et al. ....... 370/208 |
| 6,185,246 B1 | * | 2/2001 | Gilhousen ................... 370/441 |

\* cited by examiner

*Primary Examiner*—Alpus H. Hsu
*Assistant Examiner*—Afsar M. Qureshi

(57) ABSTRACT

In a wireless communication system, unique methods are presented to dynamically assign channel codes of different lengths in a manner to maintain orthogonality among assigned channels. In one embodiment, channel codes that require relatively long-lengths are assigned from a first end of a list of unassigned channel codes and channel codes of a shorter length are assigned from an opposing end of a list of unassigned channel codes. Assignment of a shorter length code sequence is made if the longer-length channel codes that depend from the proposed shorter length code sequence are available. In another embodiment, the availability of short length channel codes is derived directly from the availability of the longest length channel codes. In this embodiment, a group of longest-length channel codes that contain a common shorter-length code of the desired length are checked for availability. If all the codes of the group are available then the common shorter-length code may be assigned to transmission. Further, by assigning transmissions that require longer-length sequences from a first end of a list of channel codes and shorter length sequences from an opposing end of a list of channel codes, the number of channels available for shorter length sequences is maximized.

28 Claims, 3 Drawing Sheets

METHODS OF DYNAMICALLY ASSIGNING CHANNEL CODES OF DIFFERENT LENGTHS IN WIRELESS COMMUNICATION SYSTEMS

RELATED APPLICATIONS

The present invention is related to Provisional U.S. Patent application 60/115511, having a filing date of Jan. 11, 1999, entitled SMART CODE USAGE FOR CDMA2000 SYSTEMS, which is assigned to the same assignee and is incorporated by reference herein.

FIELD OF THE INVENTION

This invention relates to wireless communication systems and, more particularly, to methods of assigning channel codes in such communication systems.

BACKGROUND OF THE INVENTION

Wireless communication systems have been developed to allow transmission of information signals between an originating location and a destination location. Both analog (first generation) and digital (second generation) systems have been developed to transmit information signals over communication channels linking the source and destination locations. Digital methods tend to afford several advantages over analog systems. For example, improved immunity to channel noise and interference, increased capacity, and encryption for secure communications are advantages of digital systems over analog systems.

While first generation systems were primarily directed to voice communication, second generation systems are required to support both voice and data applications. Numerous techniques are known in second-generation systems for handling data transmissions that have different transmission requirements—data transmission being typically of relatively short duration, as compared to voice transmission, and usually not requiring continuous access to the communication channel. Several modulation/coding arrangements have been developed, such as frequency division multiple access (FDMA), time division multiple access (TDMA) and code division multiple access (CDMA), to increase the number of users that can access a wireless network. CDMA systems are more immune to multiple path distortion and co-channel interference than FDMA and TDMA systems and reduce the burden of frequency/channel planning that is common with FDMA and TDMA systems.

In a CDMA system, a binary code sequence (i.e., channel code) is assigned to each active user within a cell to uniquely identify the user and spread the user's signal over a larger bandwidth. Multiplied by the assigned code, the user's signal is spread over the entire channel bandwidth, which is wider than the user signal bandwidth. The ratio of the system channel bandwidth to the user's bandwidth is the "spreading gain" of the system. The capacity of the CDMA system is proportional to the "spreading gain" for a given signal-to-interference (S/I) level. After reception of the transmitted signal, the signal of each user is separated—i.e., de-spread, from the signals of other users by using a correlator keyed to the code sequence of the desired signal.

First-generation analog and second-generation digital systems are designed to support voice communication with limited data communication capabilities. Third-generation wireless systems, using wide-band channel management technologies, are expected to effectively handle a large variety of services, such as voice, video, data and imaging.

Among the features that will be supported by third-generation systems is the transmission of high-speed data between a mobile terminal and a land-line network. As is known, high-speed data communications is often characterized by a short transmission "burst" at a high data transmission rate followed by some longer period of little or no transmission activity from the data source. To accommodate the burst nature of such high-speed data services in third-generation systems, it is necessary for the communications system to assign a large bandwidth segment (corresponding to the high data rate) from time to time for the duration of the data burst. With the ability of the third generation systems to handle such bursty high-speed data transmission, throughput and delay for users can be advantageously improved. However, because of the large amount of instantaneous bandwidth required for transmission of a burst of high-speed data, the management and, particularly the allocation, of channel codes thereto, must be handled with care to avoid unwarranted interference with other services using the same frequency allocation.

In a typical wireless communication system, for example, IS-95, a voice user may have an assigned code sequence of 64 chips per symbol, however, because of time and bandwidth constraints, a typical data user may require a code sequence that has a significantly fewer number of chips per symbol. Hence, in the next generation communication systems assignment of codes of different lengths is necessary.

SUMMARY OF THE INVENTION

The invention described herein is a method to manage the assignment of channel codes of different lengths while maintaining an orthogonal relationship among the assigned codes. By selectively assigning longer length codes in the presence shorter-length codes or shorter-length channel codes in the presence of longer-length channel codes, channels codes of different lengths may be assigned in an order that avoids conflicts and maximizes the number of channel codes available for short-length code assignments (i.e., high data rate transmission).

A novel method of managing the selection of channel codes of different lengths from the available channel codes is disclosed. The methodology first distinguishes between transmissions that may use relatively long length channel codes,—e.g., voice and low data rates, and those that must use relatively short length channel codes. Long length channel codes are selected using one scheme to access a list of channel codes, while shorter-length channel codes are selected using a second scheme to access the same list of channel codes. More specifically, in accordance with one method of the invention, longer-length channel codes are selected from one end of a list of available channels codes while shorter-length channel codes are selected from an opposing end of the same list of channel codes. Accordingly, a larger number of channel codes remain grouped together for assignment to short-length code transmissions.

Further, to avoid conflicts and maintain orthogonality among the assigned codes, shorter-length channel codes are assigned after confirming that those longer-length channel codes that depend from a proposed shorter length channel code are available for assignment. If the dependent longer-length channel codes are not available for assignment then the proposed shorter-length channel code is also not available for assignment. Limiting shorter-length channel codes to channel codes in which dependent longer-length channel codes are available insures that a proposed shorter-length channel code sequence remains orthogonal to different length channel codes that are already assigned.

BRIEF DESCRIPTION OF THE FIGURES

The advantages, nature and various additional features of the invention will appear more fully upon consideration of the illustrative embodiments to be described in detail in connection with the accompanying drawings. In the drawings.

Figure 1:
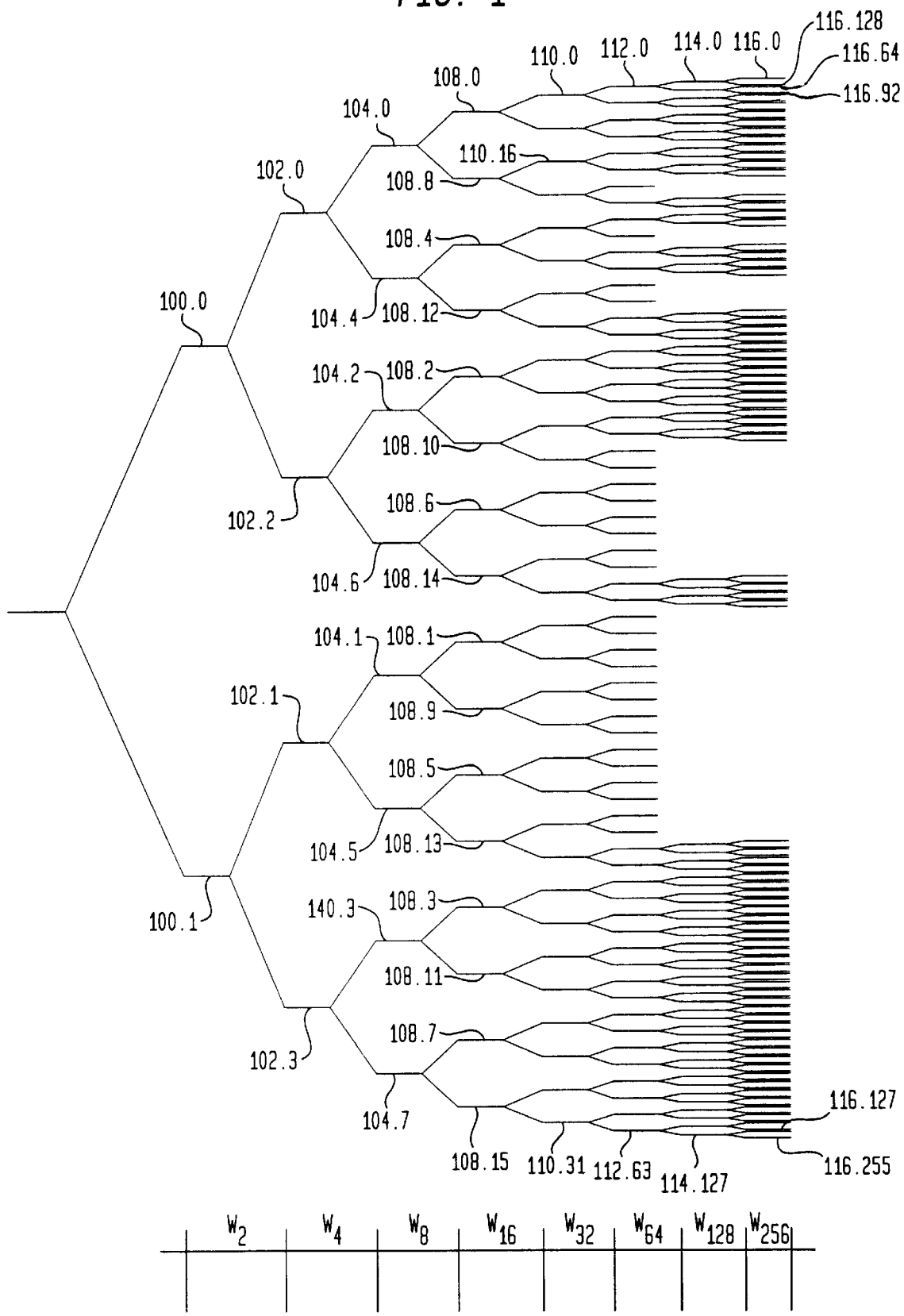
FIG. 1 illustrates a typical Walsh Coding Tree structure.

It is to be understood that these drawings are for purposes of illustrating the inventive concepts of the present invention. It will be appreciated that the same reference numerals, possibly supplemented with reference characters where appropriate, have been used throughout the figures to identify corresponding parts.

DETAILED DESCRIPTION OF THE INVENTION

Figure 2:
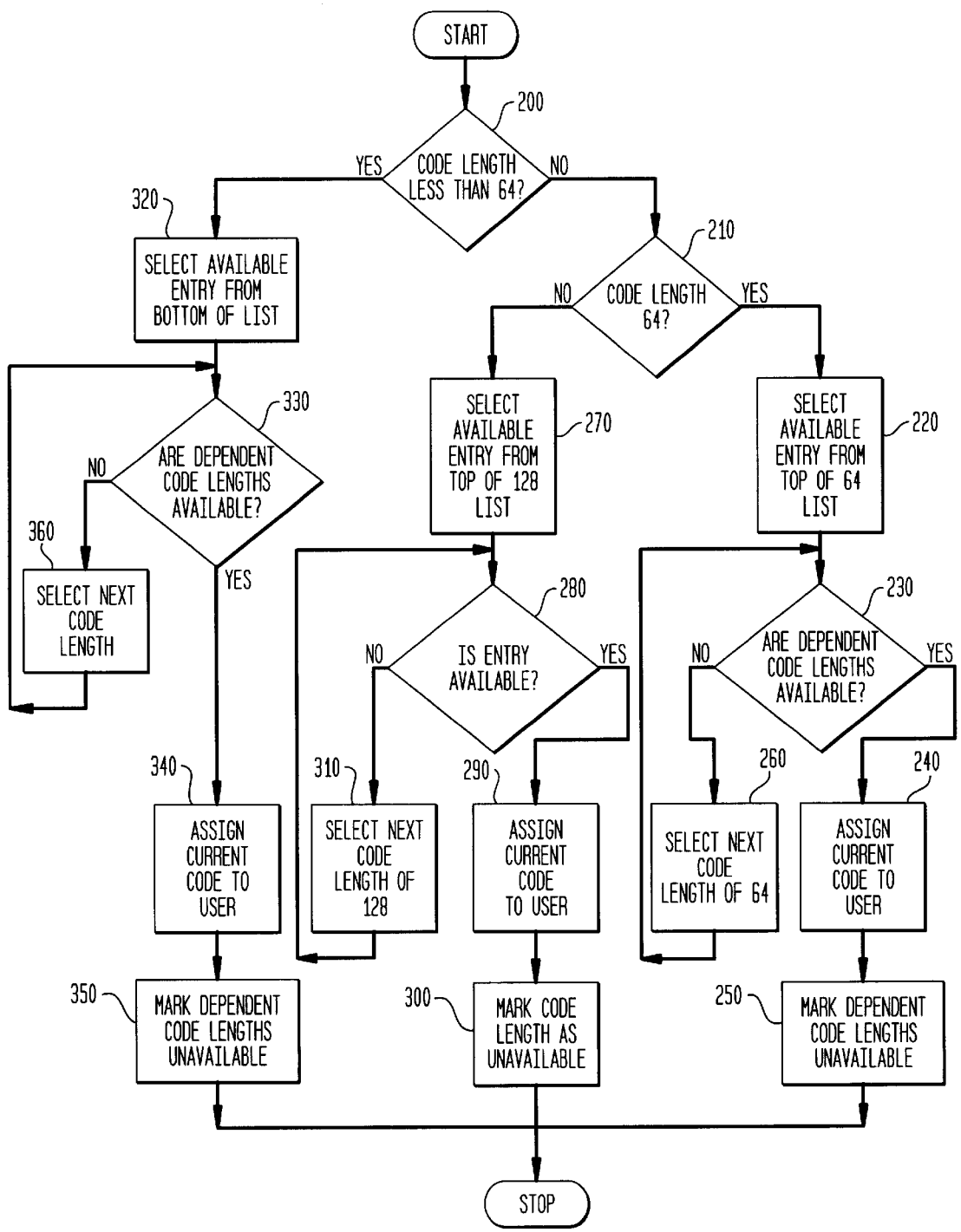
FIG. 2 represents a flow chart illustrating the method steps of one embodiment of the present invention.
Figure 3:
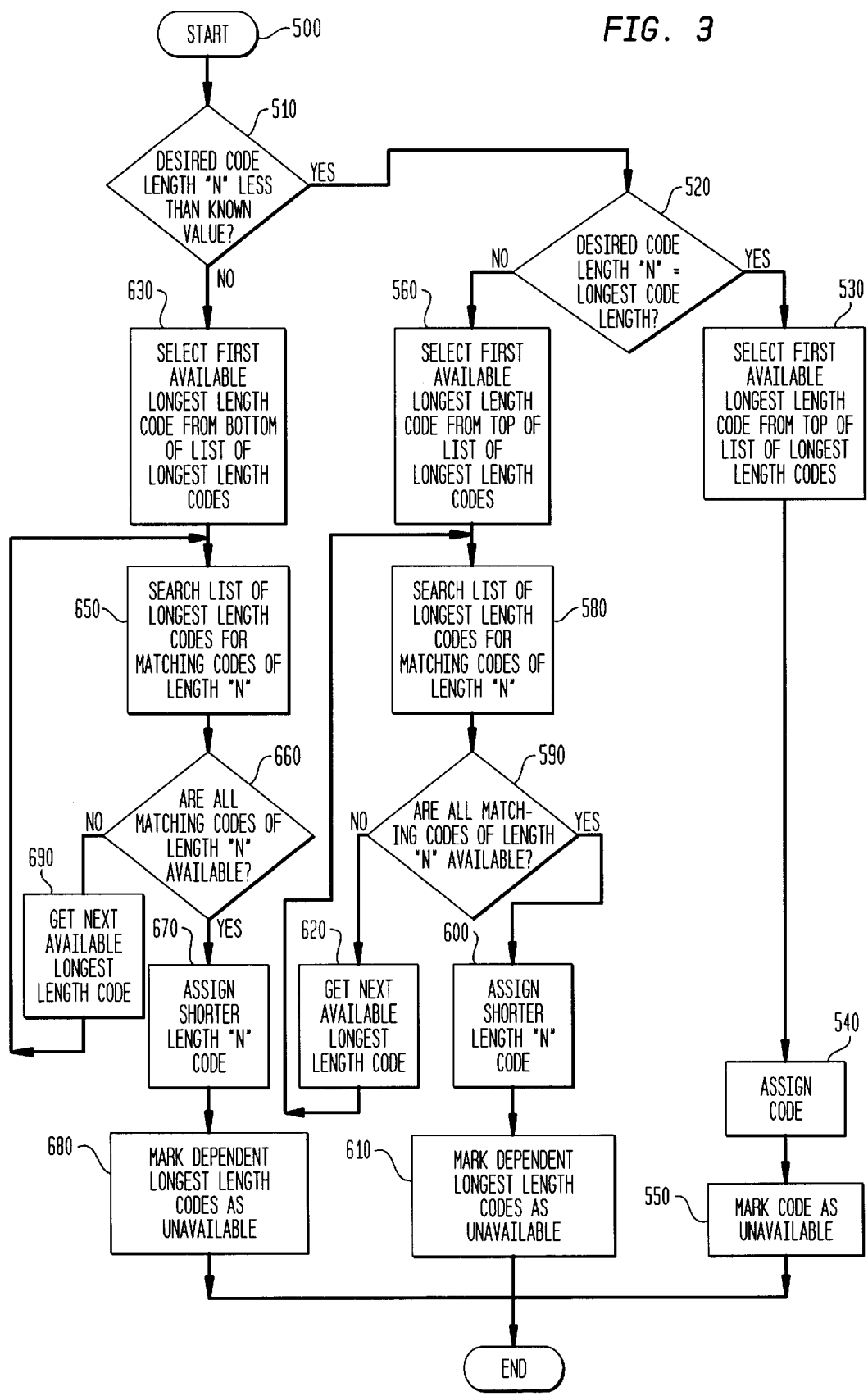
FIG. 3 represents a flow chart illustrating the method steps of a second embodiment of the present invention.

FIGS. 1 through 3 and the accompanying detailed description contained herein are to be used as illustrative examples of exemplary embodiments of the present invention and should not be construed as the only manner of practicing the invention.

The focus of early wireless systems, particularly first generation analog systems, was primarily voice communication. With second generation wireless systems, including CDMA, TDMA and GSM, came varying degrees of improvement in terms of voice quality, network capacity and enhanced services. However, while second generation systems are suitable to the provision of voice, low rate data, fax and messaging, they are generally not able to effectively and efficiently address requirements for high speed mobile data rates. The evolution to third generation wireless communications represents, essentially, a paradigm shift to the world of multimedia mobile communications, where users will have access not just to voice services but also to video, image, text, graphic and data communications. The third generation networks are expected to provide mobile users with data rates up to 2 Mbps.

Nonetheless, in wireless networks supporting these higher speed data communications applications, channel utilization must be managed very carefully to avoid delays in transmission caused by inefficient channel code assignment. As will be shown, the invention provides a novel methodology to assign channel codes of different lengths to minimize interference between different types of transmissions and to maximize the number of users.

As is known in the art, orthogonal functions are used to improve the bandwidth efficiency of spread spectrum systems. Each user in a cell uses one member of a set of binary sequences for transmission. Typically, binary sequences (channel codes) generated by Walsh or Hadamard functions are used in CDMA systems. Although the method of the present invention is disclosed with regard to Walsh functions, it would be understood by one skilled in the art that the novel methodology disclosed herein is applicable to any set of channel coding sequences that may be used to distinguish one user for another.

Walsh functions are special square matrices in which the rows are orthogonally related. Typical CDMA systems—e.g., a TIA IS-95 CDMA system, use one of 64 binary coding sequences that are, in this case, generated by 64 codes-word rows of a special square matrix of Walsh functions.

As is known in the art, a Walsh function of block length of 2 may be expressed as:

$$W_2 = \begin{bmatrix} 1 & 1 \\ 1 & -1 \end{bmatrix} \quad [1]$$

In this example there are two code-word rows—i.e., 1 1 and 1 −1.

A second example of a Walsh function of block length 2 may be expressed as:

$$W_2 = \begin{bmatrix} 0 & 0 \\ 0 & 1 \end{bmatrix} \quad [2]$$

Walsh functions of higher order block length may be generated from a lower order Walsh function using the following relationship:

$$W_{2^{n+1}} = \begin{bmatrix} W_{2^n} & W_{2^n} \\ W_{2^n} & \overline{W_{2^n}} \end{bmatrix} \quad [3]$$

where $\overline{W_{2^n}}$ is the zero-one transformation of $W_{2^n}$. A Walsh function of block length 4 thus may be expressed as:

$$W_4 = \begin{bmatrix} W_2 & W_2 \\ W_2 & \overline{W_2} \end{bmatrix} \quad [4]$$

where $\overline{W_2}$ is the transformation of $W_2$

Using the expression for $W_2$ as expressed in Equation 1, a Walsh function of block length 4 may be represented as:

$$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [3]$$

Similarly, a Walsh function of order 8 may be generated from a Walsh function of 4 as:

$$W_8 = \begin{bmatrix} W_4 & W_4 \\ W_4 & \overline{W_4} \end{bmatrix} \quad [4]$$

And a Walsh function of order 64, may be generated using the following expression:

$$W_{64} = \begin{bmatrix} W_{32} & W_{32} \\ W_{32} & \overline{W_{32}} \end{bmatrix} \quad [5]$$

Equation 5 represents a square matrix of 64 uniquely identified rows (and columns). The 64 code-word rows provide for the unique identification of 64 users. In a typical wireless communication system using Walsh functions of block length 64, each user is assigned a unique code-word row and the user's data symbols are multiplying by the assigned code-word row. Each user symbol is essentially divided into 64 Walsh "chips" that the receiver uses to distinguish the transmitted symbols of one user from those of another.

Typically, the time to transmit a single Walsh chip is 0.814 microseconds (1/1.2288 Mhz). Thus, in a IS-95 system using 64 chips per symbol, the transmission of one symbol requires 52.08 microseconds.

Although a IS-95 system is capable of using 64 channel codes for transmission, not all are available for user traffic. Some channel codes are necessarily used by the wireless system to maintain proper coordination between transmitting and receiving sites, i.e. system overhead. In a IS-95 system, typically, three to nine channel codes are pre-assigned for dedicated system overhead operations. One channel code is dedicated for synchronization, one channel code is dedicated for a pilot channel and one to seven channel codes are dedicated for paging.

To increase the number of users per frequency channel and to provide new services, additional CDMA systems have been proposed. One proposed CDMA system entitled, CDMA 2000-1X (3G1X), increases the number of channel codes to 128 by using 128 chips per symbols. In a second proposed CDMA system, entitled CMDA 2000-3X (3G3X), the number of chips is increased to 256. As would be understood by those skilled in the art, the channel codes of 3G1X and 3G3X systems, using channel codes generated by Walsh block lengths of order 128 and 256, respectively, may be generated by continuing the progression of Walsh matrix generation expressed in Equation 3 and Equation 5.

While these next generation systems increase the number of potential users that may be transmitting on a single frequency, the time necessary to transmit high rate digital data also increases. For example, in a 3G3X system, transmitting 256 chips for each user symbol the time of transmission of a single symbol increases significantly. Considering a typical chip time of 0.804 microseconds, the transmission of one symbol, of 256 chips, is 833 microseconds. While this time of transmission may be acceptable for voice and some low data-rate transmissions, this transmission time becomes excessively long for high data-rate transmissions. Accordingly, for high data rate transmissions, a channel code sequence of lower order must necessarily be used.

However, when assigning channel codes of different lengths the orthogonality among channel codes of different lengths is not easily determined from the matrix notation when, for example, using Walsh codes. Thus, in order to determine the orthogonal relationship between codes of different length, in this case using Walsh functions, a Walsh Family Tree structure may be formulated in accordance with the rule that $$W_{2^n}[j] \rightarrow W_{2^{n+1}}[j] \text{ and } W_{2^{n+1}}[j+2^n] \qquad [6]$$

FIG. 1 illustrates a Walsh Family tree generated in accordance with Equation 6 for Walsh block lengths of order $2^n$ for n=1, 2 . . . 8 (i.e., code-rows of 2 through 256). In this illustration, elements 100.0, 100.1 represent the two channels of a Walsh code length of order 2 ($W_2$). Elements 102.0, 102.1, 102.2, 102.3 represent the four channels of Walsh code length of order 4 ($W_4$). In accordance with Equation 6, element 100.0 generates elements 102.0, 102.2 and element 100.1 generates elements 102.1, 102.3. As will become apparent to those skilled in the art, the numbering of elements in the depicted family tree correspond to rows in the related Walsh matrix. That is, element 100.0 corresponds to row 0 and element 100.1 corresponds to row 1 of the Walsh matrix expressed in Equation 1 and elements 102.0, 102.1, 102.2, 102.3 correspond to rows 0, 1, 2, and 3, respectively, of the Walsh matrix of order 4 expressed in Equation 4. Similarly, the elements of the Walsh function of order 4 generate eight elements as a Walsh function of order 8 wherein element 102.0 generates elements 104.0, 104.4, element 102.2 generates elements 104.2, 104.6, element 102.1 generates elements 104.1, 104.5 and element 102.3 generates 104.3, 104.7. Accordingly, and as previously discussed, an IS-95 CDMA system would select channel codes from the 64 code-word rows represented by elements 112.0 through 112.63. Further, a 3G3X system would typically select a channel code from the 256 code-word rows represented by elements 116.0 through 116.255. As would be understood by those skilled in the art, the terminology, channel code, code-word row and code sequence, have been used synonymously herein, and henceforth, will be used interchangeably.

The code sequences for the channel codes using a Walsh function expressed in Equation 1 may now be determined for each of the elements of FIG. 1. These channel code sequences are summarized in Table 1 for $W_2$, $W_4$ and $W_8$ wherein the channel codes for $W_2$ are represented by Equation 1.

As would be understood in the art, channel codes of higher order using Walsh functions may be determined by expanding the binary sequences of Table 1. As the details of the generation of channel codes sequences of higher order would be understood by one skilled in the art it is not necessary to continue the development of such sequences herein.

TABLE 1

Code Sequences for Walsh Codes-Row

| $W_2$ | code | | $W_4$ | code | | | | $W_8$ | code | | | | | | | |
|---|---|---|---|---|---|---|---|---|---|---|---|---|---|---|---|---|
| 100.0 | 1 | 1 | 102.0 | 1 | 1 | 1 | 1 | 104.0 | 1 | 1 | 1 | 1 | 1 | 1 | 1 | 1 |
| | | | | | | | | 104.4 | 1 | 1 | 1 | 1 | −1 | −1 | −1 | −1 |
| | | | 102.2 | 1 | 1 | −1 | −1 | 104.2 | 1 | 1 | −1 | −1 | 1 | 1 | −1 | −1 |
| | | | | | | | | 104.6 | 1 | 1 | −1 | −1 | −1 | −1 | 1 | 1 |
| 100.1 | 1 | −1 | 102.1 | 1 | −1 | 1 | −1 | 104.1 | 1 | −1 | 1 | −1 | 1 | −1 | 1 | −1 |
| | | | | | | | | 104.5 | 1 | −1 | 1 | −1 | −1 | 1 | −1 | 1 |
| | | | 102.3 | 1 | −1 | −1 | 1 | 104.3 | 1 | −1 | −1 | 1 | 1 | −1 | −1 | 1 |
| | | | | | | | | 104.7 | 1 | −1 | −1 | 1 | −1 | 1 | 1 | −1 |

From Table 1 it can be observed that the elements in the rows of longer-length codes are dependently related to shorter-length channel codes. For example, the codes represented by elements 102.0, 102.2 depend from the code represented by element 100.0 as the longer-length codes represented by elements 102.0, 102.2 contain the shorter-length channel code of element 100.0 (i.e., 11 and 1 −1). Similarly, codes represented by elements 104.0, 104.4 depend from the shorter-length code represented by element 102.0 and codes represented by elements 104.1, 104.3 depend from the shorter-length code represented by element 102.1. In this example of channel codes two signals that are assigned to elements 104.0, 104.4 respectively, are uniquely identified as the channels are unique and orthogonally related. However, when one signal is assigned to the channel code represented by element 102.0 and one signal is assigned to the channel code represented by element 104.0, the assigned channel codes do not uniquely identify the two signals. In this case, the transmissions of these two users would not be decoded properly.

Table 2 tabulates the relationship among the elements of the Walsh functions of different lengths in accordance with Equation 5. Column 1 of Table 2 corresponds to the rows of a 256-chip Walsh code matrix, Column 2 corresponds to the rows a 128-chip Walsh code matrix and Column 3 corresponds to the rows of a 64-chip Walsh code matrix. Column 8 corresponds to the two rows of a 2-chip Walsh code matrix. Table 2 may now be related to FIG. 1. For example, the first row in Table 2 corresponds to the tree structure elements 100.0, 102.0, 104.0, 108.0, 110.0, 112.0, 114.0, 116.0. The second row, in Table 2, corresponds to tree structure elements 100.0, 102.0, 104.0, 108.0, 110.0, 112.0, 114.0, 116.128. From Table 2 the relationship between longer-length channel codes and shorter-length channel codes for all the codes of up to a 256-chip channel code may be determined.

From Table 1 and Table 2, it may be observed that channel codes of different chip length that are in the same row are not orthogonally related as the longer-length code is generated from a shorter-length code. For example, in the $8^{th}$ row of Table 2, the $224^{th}$ row in column $W_{256}$ is generated from the $96^{th}$ row in column $W_{128}$ and the 32-th row in

TABLE 2

Family tree of Walsh codes

| $W_{256}$ | $W_{128}$ | $W_{64}$ | $W_{32}$ | $W_{16}$ | $W_8$ | $W_4$ | $W_2$ |
|---|---|---|---|---|---|---|---|
| 0 | 0 | 0 | 0 | 0 | 0 | 0 | 0 |
| 128 | 0 | 0 | 0 | 0 | 0 | 0 | 0 |
| 64 | 64 | 0 | 0 | 0 | 0 | 0 | 0 |
| 192 | 64 | 0 | 0 | 0 | 0 | 0 | 0 |
| 32 | 32 | 32 | 0 | 0 | 0 | 0 | 0 |
| 160 | 32 | 32 | 0 | 0 | 0 | 0 | 0 |
| 96 | 96 | 32 | 0 | 0 | 0 | 0 | 0 |
| 224 | 96 | 32 | 0 | 0 | 0 | 0 | 0 |
| 16 | 16 | 16 | 16 | 0 | 0 | 0 | 0 |
| 144 | 16 | 16 | 16 | 0 | 0 | 0 | 0 |
| 80 | 80 | 16 | 16 | 0 | 0 | 0 | 0 |
| 208 | 80 | 16 | 16 | 0 | 0 | 0 | 0 |
| 48 | 48 | 48 | 16 | 0 | 0 | 0 | 0 |
| 176 | 48 | 48 | 16 | 0 | 0 | 0 | 0 |
| 112 | 112 | 48 | 16 | 0 | 0 | 0 | 0 |
| 240 | 112 | 48 | 16 | 0 | 0 | 0 | 0 |
| 8 | 8 | 8 | 8 | 8 | 0 | 0 | 0 |
| 136 | 8 | 8 | 8 | 8 | 0 | 0 | 0 |
| 72 | 72 | 8 | 8 | 8 | 0 | 0 | 0 |
| 200 | 72 | 8 | 8 | 8 | 0 | 0 | 0 |
| 40 | 40 | 40 | 8 | 8 | 0 | 0 | 0 |
| 168 | 40 | 40 | 8 | 8 | 0 | 0 | 0 |
| 104 | 104 | 40 | 8 | 8 | 0 | 0 | 0 |
| 232 | 104 | 40 | 8 | 8 | 0 | 0 | 0 |
| 24 | 24 | 24 | 24 | 8 | 0 | 0 | 0 |
| 152 | 24 | 24 | 24 | 8 | 0 | 0 | 0 |
| 88 | 88 | 24 | 24 | 8 | 0 | 0 | 0 |
| 216 | 88 | 24 | 24 | 8 | 0 | 0 | 0 |
| 56 | 56 | 56 | 24 | 8 | 0 | 0 | 0 |
| 184 | 56 | 56 | 24 | 8 | 0 | 0 | 0 |
| 120 | 120 | 56 | 24 | 8 | 0 | 0 | 0 |
| 248 | 120 | 56 | 24 | 8 | 0 | 0 | 0 |
| 4 | 4 | 4 | 4 | 4 | 4 | 0 | 0 |
| 132 | 4 | 4 | 4 | 4 | 4 | 0 | 0 |
| 68 | 68 | 4 | 4 | 4 | 4 | 0 | 0 |
| 196 | 68 | 4 | 4 | 4 | 4 | 0 | 0 |
| 36 | 36 | 36 | 4 | 4 | 4 | 0 | 0 |
| 164 | 36 | 36 | 4 | 4 | 4 | 0 | 0 |
| 100 | 100 | 36 | 4 | 4 | 4 | 0 | 0 |
| 228 | 100 | 36 | 4 | 4 | 4 | 0 | 0 |
| 20 | 20 | 20 | 20 | 4 | 4 | 0 | 0 |
| 148 | 20 | 20 | 20 | 4 | 4 | 0 | 0 |
| 84 | 84 | 20 | 20 | 4 | 4 | 0 | 0 |
| 212 | 84 | 20 | 20 | 4 | 4 | 0 | 0 |
| 52 | 52 | 52 | 20 | 4 | 4 | 0 | 0 |
| 180 | 52 | 52 | 20 | 4 | 4 | 0 | 0 |
| 116 | 116 | 52 | 20 | 4 | 4 | 0 | 0 |
| 244 | 116 | 52 | 20 | 4 | 4 | 0 | 0 |
| 12 | 12 | 12 | 12 | 12 | 4 | 0 | 0 |
| 140 | 12 | 12 | 12 | 12 | 4 | 0 | 0 |
| 76 | 76 | 12 | 12 | 12 | 4 | 0 | 0 |
| 204 | 76 | 12 | 12 | 12 | 4 | 0 | 0 |
| 44 | 44 | 44 | 12 | 12 | 4 | 0 | 0 |
| 172 | 44 | 44 | 12 | 12 | 4 | 0 | 0 |
| 108 | 108 | 44 | 12 | 12 | 4 | 0 | 0 |
| 236 | 108 | 44 | 12 | 12 | 4 | 0 | 0 |
| 28 | 28 | 28 | 28 | 12 | 4 | 0 | 0 |
| 156 | 28 | 28 | 28 | 12 | 4 | 0 | 0 |
| 92 | 92 | 28 | 28 | 12 | 4 | 0 | 0 |
| 220 | 92 | 28 | 28 | 12 | 4 | 0 | 0 |
| 60 | 60 | 60 | 28 | 12 | 4 | 0 | 0 |
| 188 | 60 | 60 | 28 | 12 | 4 | 0 | 0 |
| 124 | 124 | 60 | 28 | 12 | 4 | 0 | 0 |
| 252 | 124 | 60 | 28 | 12 | 4 | 0 | 0 |
| 2 | 2 | 2 | 2 | 2 | 2 | 2 | 0 |
| 130 | 2 | 2 | 2 | 2 | 2 | 2 | 0 |
| 66 | 66 | 2 | 2 | 2 | 2 | 2 | 0 |
| 194 | 66 | 2 | 2 | 2 | 2 | 2 | 0 |
| 34 | 34 | 34 | 2 | 2 | 2 | 2 | 0 |
| 162 | 34 | 34 | 2 | 2 | 2 | 2 | 0 |
| 98 | 98 | 34 | 2 | 2 | 2 | 2 | 0 |
| 226 | 98 | 34 | 2 | 2 | 2 | 2 | 0 |
| 18 | 18 | 18 | 18 | 2 | 2 | 2 | 0 |
| 146 | 18 | 18 | 18 | 2 | 2 | 2 | 0 |
| 82 | 82 | 18 | 18 | 2 | 2 | 2 | 0 |
| 210 | 82 | 18 | 18 | 2 | 2 | 2 | 0 |
| 50 | 50 | 50 | 18 | 2 | 2 | 2 | 0 |
| 178 | 50 | 50 | 18 | 2 | 2 | 2 | 0 |
| 114 | 114 | 50 | 18 | 2 | 2 | 2 | 0 |
| 242 | 114 | 50 | 18 | 2 | 2 | 2 | 0 |
| 10 | 10 | 10 | 10 | 10 | 2 | 2 | 0 |
| 138 | 10 | 10 | 10 | 10 | 2 | 2 | 0 |
| 74 | 74 | 10 | 10 | 10 | 2 | 2 | 0 |
| 202 | 74 | 10 | 10 | 10 | 2 | 2 | 0 |
| 42 | 42 | 42 | 10 | 10 | 2 | 2 | 0 |
| 170 | 42 | 42 | 10 | 10 | 2 | 2 | 0 |
| 106 | 106 | 42 | 10 | 10 | 2 | 2 | 0 |
| 234 | 106 | 42 | 10 | 10 | 2 | 2 | 0 |
| 26 | 26 | 26 | 26 | 10 | 2 | 2 | 0 |
| 154 | 26 | 26 | 26 | 10 | 2 | 2 | 0 |
| 90 | 90 | 26 | 26 | 10 | 2 | 2 | 0 |
| 218 | 90 | 26 | 26 | 10 | 2 | 2 | 0 |
| 58 | 58 | 58 | 26 | 10 | 2 | 2 | 0 |
| 186 | 58 | 58 | 26 | 10 | 2 | 2 | 0 |
| 122 | 122 | 58 | 26 | 10 | 2 | 2 | 0 |
| 250 | 122 | 58 | 26 | 10 | 2 | 2 | 0 |
| 6 | 6 | 6 | 6 | 6 | 6 | 2 | 0 |
| 134 | 6 | 6 | 6 | 6 | 6 | 2 | 0 |
| 70 | 70 | 6 | 6 | 6 | 6 | 2 | 0 |
| 198 | 70 | 6 | 6 | 6 | 6 | 2 | 0 |
| 38 | 38 | 38 | 6 | 6 | 6 | 2 | 0 |
| 166 | 38 | 38 | 6 | 6 | 6 | 2 | 0 |
| 102 | 102 | 38 | 6 | 6 | 6 | 2 | 0 |
| 230 | 102 | 38 | 6 | 6 | 6 | 2 | 0 |
| 22 | 22 | 22 | 22 | 6 | 6 | 2 | 0 |
| 150 | 22 | 22 | 22 | 6 | 6 | 2 | 0 |
| 86 | 86 | 22 | 22 | 6 | 6 | 2 | 0 |
| 214 | 86 | 22 | 22 | 6 | 6 | 2 | 0 |
| 54 | 54 | 54 | 22 | 6 | 6 | 2 | 0 |
| 182 | 54 | 54 | 22 | 6 | 6 | 2 | 0 |
| 118 | 118 | 54 | 22 | 6 | 6 | 2 | 0 |
| 246 | 118 | 54 | 22 | 6 | 6 | 2 | 0 |
| 14 | 14 | 14 | 14 | 14 | 6 | 2 | 0 |
| 142 | 14 | 14 | 14 | 14 | 6 | 2 | 0 |
| 78 | 78 | 14 | 14 | 14 | 6 | 2 | 0 |

TABLE 2-continued

Family tree of Walsh codes

| W256 | W128 | W64 | W32 | W16 | W8 | W4 | W2 |
|---|---|---|---|---|---|---|---|
| 206 | 78 | 14 | 14 | 14 | 6 | 2 | 0 |
| 46 | 46 | 46 | 14 | 14 | 6 | 2 | 0 |
| 174 | 46 | 46 | 14 | 14 | 6 | 2 | 0 |
| 110 | 110 | 46 | 14 | 14 | 6 | 2 | 0 |
| 238 | 110 | 46 | 14 | 14 | 6 | 2 | 0 |
| 30 | 30 | 30 | 30 | 14 | 6 | 2 | 0 |
| 158 | 30 | 30 | 30 | 14 | 6 | 2 | 0 |
| 94 | 94 | 30 | 30 | 14 | 6 | 2 | 0 |
| 222 | 94 | 30 | 30 | 14 | 6 | 2 | 0 |
| 62 | 62 | 62 | 30 | 14 | 6 | 2 | 0 |
| 190 | 62 | 62 | 30 | 14 | 6 | 2 | 0 |
| 126 | 126 | 62 | 30 | 14 | 6 | 2 | 0 |
| 254 | 126 | 62 | 30 | 14 | 6 | 2 | 0 |
| 1 | 1 | 1 | 1 | 1 | 1 | 1 | 1 |
| 129 | 1 | 1 | 1 | 1 | 1 | 1 | 1 |
| 65 | 65 | 1 | 1 | 1 | 1 | 1 | 1 |
| 193 | 65 | 1 | 1 | 1 | 1 | 1 | 1 |
| 33 | 33 | 33 | 1 | 1 | 1 | 1 | 1 |
| 161 | 33 | 33 | 1 | 1 | 1 | 1 | 1 |
| 97 | 97 | 33 | 1 | 1 | 1 | 1 | 1 |
| 225 | 97 | 33 | 1 | 1 | 1 | 1 | 1 |
| 17 | 17 | 17 | 17 | 1 | 1 | 1 | 1 |
| 145 | 17 | 17 | 17 | 1 | 1 | 1 | 1 |
| 81 | 81 | 17 | 17 | 1 | 1 | 1 | 1 |
| 209 | 81 | 17 | 17 | 1 | 1 | 1 | 1 |
| 49 | 49 | 49 | 17 | 1 | 1 | 1 | 1 |
| 177 | 49 | 49 | 17 | 1 | 1 | 1 | 1 |
| 113 | 113 | 49 | 17 | 1 | 1 | 1 | 1 |
| 241 | 113 | 49 | 17 | 1 | 1 | 1 | 1 |
| 9 | 9 | 9 | 9 | 9 | 1 | 1 | 1 |
| 137 | 9 | 9 | 9 | 9 | 1 | 1 | 1 |
| 73 | 73 | 9 | 9 | 9 | 1 | 1 | 1 |
| 201 | 73 | 9 | 9 | 9 | 1 | 1 | 1 |
| 41 | 41 | 41 | 9 | 9 | 1 | 1 | 1 |
| 169 | 41 | 41 | 9 | 9 | 1 | 1 | 1 |
| 105 | 105 | 41 | 9 | 9 | 1 | 1 | 1 |
| 233 | 105 | 41 | 9 | 9 | 1 | 1 | 1 |
| 25 | 25 | 25 | 25 | 9 | 1 | 1 | 1 |
| 153 | 25 | 25 | 25 | 9 | 1 | 1 | 1 |
| 89 | 89 | 25 | 25 | 9 | 1 | 1 | 1 |
| 217 | 89 | 25 | 25 | 9 | 1 | 1 | 1 |
| 57 | 57 | 57 | 25 | 9 | 1 | 1 | 1 |
| 185 | 57 | 57 | 25 | 9 | 1 | 1 | 1 |
| 121 | 121 | 57 | 25 | 9 | 1 | 1 | 1 |
| 249 | 121 | 57 | 25 | 9 | 1 | 1 | 1 |
| 5 | 5 | 5 | 5 | 5 | 5 | 1 | 1 |
| 133 | 5 | 5 | 5 | 5 | 5 | 1 | 1 |
| 69 | 69 | 5 | 5 | 5 | 5 | 1 | 1 |
| 197 | 69 | 5 | 5 | 5 | 5 | 1 | 1 |
| 37 | 37 | 37 | 5 | 5 | 5 | 1 | 1 |
| 165 | 37 | 37 | 5 | 5 | 5 | 1 | 1 |
| 101 | 101 | 37 | 5 | 5 | 5 | 1 | 1 |
| 229 | 101 | 37 | 5 | 5 | 5 | 1 | 1 |
| 21 | 21 | 21 | 21 | 5 | 5 | 1 | 1 |
| 149 | 21 | 21 | 21 | 5 | 5 | 1 | 1 |
| 85 | 85 | 21 | 21 | 5 | 5 | 1 | 1 |
| 213 | 85 | 21 | 21 | 5 | 5 | 1 | 1 |
| 53 | 53 | 53 | 21 | 5 | 5 | 1 | 1 |
| 181 | 53 | 53 | 21 | 5 | 5 | 1 | 1 |
| 117 | 117 | 53 | 21 | 5 | 5 | 1 | 1 |
| 245 | 117 | 53 | 21 | 5 | 5 | 1 | 1 |
| 13 | 13 | 13 | 13 | 13 | 5 | 1 | 1 |
| 141 | 13 | 13 | 13 | 13 | 5 | 1 | 1 |
| 77 | 77 | 13 | 13 | 13 | 5 | 1 | 1 |
| 205 | 77 | 13 | 13 | 13 | 5 | 1 | 1 |
| 45 | 45 | 45 | 13 | 13 | 5 | 1 | 1 |
| 173 | 45 | 45 | 13 | 13 | 5 | 1 | 1 |
| 109 | 109 | 45 | 13 | 13 | 5 | 1 | 1 |
| 237 | 109 | 45 | 13 | 13 | 5 | 1 | 1 |
| 29 | 29 | 29 | 29 | 13 | 5 | 1 | 1 |
| 157 | 29 | 29 | 29 | 13 | 5 | 1 | 1 |
| 93 | 93 | 29 | 29 | 13 | 5 | 1 | 1 |
| 221 | 93 | 29 | 29 | 13 | 5 | 1 | 1 |
| 61 | 61 | 61 | 29 | 13 | 5 | 1 | 1 |
| 189 | 61 | 61 | 29 | 13 | 5 | 1 | 1 |
| 125 | 125 | 61 | 29 | 13 | 5 | 1 | 1 |
| 253 | 125 | 61 | 29 | 13 | 5 | 1 | 1 |
| 3 | 3 | 3 | 3 | 3 | 3 | 3 | 1 |
| 131 | 3 | 3 | 3 | 3 | 3 | 3 | 1 |
| 67 | 67 | 3 | 3 | 3 | 3 | 3 | 1 |
| 195 | 67 | 3 | 3 | 3 | 3 | 3 | 1 |
| 35 | 35 | 35 | 3 | 3 | 3 | 3 | 1 |
| 163 | 35 | 35 | 3 | 3 | 3 | 3 | 1 |
| 99 | 99 | 35 | 3 | 3 | 3 | 3 | 1 |
| 227 | 99 | 35 | 3 | 3 | 3 | 3 | 1 |
| 19 | 19 | 19 | 19 | 3 | 3 | 3 | 1 |
| 147 | 19 | 19 | 19 | 3 | 3 | 3 | 1 |
| 83 | 83 | 19 | 19 | 3 | 3 | 3 | 1 |
| 211 | 83 | 19 | 19 | 3 | 3 | 3 | 1 |
| 51 | 51 | 51 | 19 | 3 | 3 | 3 | 1 |
| 179 | 51 | 51 | 19 | 3 | 3 | 3 | 1 |
| 115 | 115 | 51 | 19 | 3 | 3 | 3 | 1 |
| 243 | 115 | 51 | 19 | 3 | 3 | 3 | 1 |
| 11 | 11 | 11 | 11 | 11 | 3 | 3 | 1 |
| 139 | 11 | 11 | 11 | 11 | 3 | 3 | 1 |
| 75 | 75 | 11 | 11 | 11 | 3 | 3 | 1 |
| 203 | 75 | 11 | 11 | 11 | 3 | 3 | 1 |
| 43 | 43 | 43 | 11 | 11 | 3 | 3 | 1 |
| 171 | 43 | 43 | 11 | 11 | 3 | 3 | 1 |
| 107 | 107 | 43 | 11 | 11 | 3 | 3 | 1 |
| 235 | 107 | 43 | 11 | 11 | 3 | 3 | 1 |
| 27 | 27 | 27 | 27 | 11 | 3 | 3 | 1 |
| 155 | 27 | 27 | 27 | 11 | 3 | 3 | 1 |
| 91 | 91 | 27 | 27 | 11 | 3 | 3 | 1 |
| 219 | 91 | 27 | 27 | 11 | 3 | 3 | 1 |
| 59 | 59 | 59 | 27 | 11 | 3 | 3 | 1 |
| 187 | 59 | 59 | 27 | 11 | 3 | 3 | 1 |
| 123 | 123 | 59 | 27 | 11 | 3 | 3 | 1 |
| 251 | 123 | 59 | 27 | 11 | 3 | 3 | 1 |
| 7 | 7 | 7 | 7 | 7 | 7 | 3 | 1 |
| 135 | 7 | 7 | 7 | 7 | 7 | 3 | 1 |
| 71 | 71 | 7 | 7 | 7 | 7 | 3 | 1 |
| 199 | 71 | 7 | 7 | 7 | 7 | 3 | 1 |
| 39 | 39 | 39 | 7 | 7 | 7 | 3 | 1 |
| 167 | 39 | 39 | 7 | 7 | 7 | 3 | 1 |
| 103 | 103 | 39 | 7 | 7 | 7 | 3 | 1 |
| 231 | 103 | 39 | 7 | 7 | 7 | 3 | 1 |
| 23 | 23 | 23 | 23 | 7 | 7 | 3 | 1 |
| 151 | 23 | 23 | 23 | 7 | 7 | 3 | 1 |
| 87 | 87 | 23 | 23 | 7 | 7 | 3 | 1 |
| 215 | 87 | 23 | 23 | 7 | 7 | 3 | 1 |
| 55 | 55 | 55 | 23 | 7 | 7 | 3 | 1 |
| 183 | 55 | 55 | 23 | 7 | 7 | 3 | 1 |
| 119 | 119 | 55 | 23 | 7 | 7 | 3 | 1 |
| 247 | 119 | 55 | 23 | 7 | 7 | 3 | 1 |
| 15 | 15 | 15 | 15 | 15 | 7 | 3 | 1 |
| 143 | 15 | 15 | 15 | 15 | 7 | 3 | 1 |
| 79 | 79 | 15 | 15 | 15 | 7 | 3 | 1 |
| 207 | 79 | 15 | 15 | 15 | 7 | 3 | 1 |
| 175 | 47 | 47 | 15 | 15 | 7 | 3 | 1 |
| 47 | 47 | 47 | 15 | 15 | 7 | 3 | 1 |
| 111 | 111 | 47 | 15 | 15 | 7 | 3 | 1 |
| 239 | 111 | 47 | 15 | 15 | 7 | 3 | 1 |
| 31 | 31 | 31 | 31 | 15 | 7 | 3 | 1 |
| 159 | 31 | 31 | 31 | 15 | 7 | 3 | 1 |
| 95 | 95 | 31 | 31 | 15 | 7 | 3 | 1 |
| 223 | 95 | 31 | 31 | 15 | 7 | 3 | 1 |
| 63 | 63 | 63 | 31 | 15 | 7 | 3 | 1 |
| 191 | 63 | 63 | 31 | 15 | 7 | 3 | 1 |
| 127 | 127 | 63 | 31 | 15 | 7 | 3 | 1 |
| 255 | 127 | 63 | 31 | 15 | 7 | 3 | 1 |

$W_{64}$. Thus, $W_{256}[224]$ cannot be used concurrently with $W_{28}[96]$ or $W_{64}[32]$ otherwise the advantage of orthogonal modulation is destroyed.

Accordingly, in the operation of, for example, a 3G3X CDMA system using channel codes of length of 256, a high data signal cannot be assigned shorter-length channel code sequence $W_{64}[32]$ if any of the channel codes $W_{256}[32]$, $W_{256}[160]$, $W_{256}[96]$ or $W_{256}[224]$ are assigned. Similarly, when a high data rate transmission is assigned to shorter-length channel sequence, for example, $W_{64}[32]$, then the longer-length channel code sequences that depend from this shorter-length sequence are not available for assignment.

The method of the invention allows for the selection of differing code lengths to maintain orthogonality among the assigned codes of different lengths while maintaining a larger number of available codes for data transmission. FIG. 2 represents a flow chart of one embodiment of the novel methodology of the present invention for the selection channel codes of different lengths. In this exemplary embodiment, channel code assignments are made for a 3G1X CDMA system of 128 chips per channel. It would be understood by one skilled in the art to expand the illustrated embodiment of the present invention to include channel code of even longer lengths.

Referring now to FIG. 2, the method of the invention accepts as an input the code block length that is required for the transmission of the user data. This length is typically negotiated between the transmitter and receiver during the establishment of the initial wireless connection.

The methodology then determines, at decision block 200, if the code length necessary for acceptable transmission is below a known value. In this exemplary embodiment, and to maintain compatibility with current wireless communication systems, a known length corresponds to the code length for typical IS-95 voice transmission (i.e., code length 64). If the code length is at or above this known limit, then a determination is made, at decision block 210, to distinguish between the two lengths illustrated.

When the desired rate is greater that the known value (in this exemplary case, 128), then the first channel from a list of 128-chip channel codes is selected at processing block 270. In this illustrated example, the list of channels is composed of 128 channels used in a 3G1X wireless communication system. Further, in the exemplary embodiment of the methodology illustrated, the first channel is selected by searching from the top of a list of 128-channel codes. As would be understood by those skilled in the art, the selection of a first available channel may be preformed by numerous other methods. For example, the first channel may the determined beginning from the last 128-channel assigned.

At decision block 280, a determination is made of the availability of the selected channel. If the channel is unavailable, then the method of the invention progresses through the list of 128 channel codes at processing block 310 searching for the next channel. The next channel is subjected to tests for availability at decision block 280. When a channel is determined to be available, then the channel is assigned to the user, at processing block 290, and the channel is marked as unavailable at processing block 300.

Returning to decision block 210, if the code length is equal to 64, then at processing block 220 the first available channel from a list of 64-chip channel codes is selected. When an available channel code is found, a check of the availability of all longer-length channel codes that dependent from the selected shorter-length channel code is then made at decision block 230. In the illustrated embodiment, the two longer-length codes that dependent from the selected 64-chip channel would be checked for availability.

Whenever one longer-length channel is determined to be unavailable, then the shorter-length channel cannot be assigned. Thus, at processing block 260, the next available 64-chip channel code is selected for processing. The assignability of this 64-chip channel code is similarly determined by checking the availability of longer-length dependent channels.

When it is determined that the dependent channel codes are available, then the shorter-length channel is assigned to the user at processing block 240 and the shorter-length and dependent longer-length channels are marked as being unavailable at processing block 250. As would be understood in the art, if the illustrated example were expanded to operate in a 3G3X system then the availability of the four 256-chip channels that depend from the two dependent 128-chip channels would also be checked.

Returning to decision block 210, when the length negotiated between transmitter and receiver is less than a known value, then a shorter-length channel code that does not conflict with an already assigned longer-length channel must be assigned. In accordance with the method of the invention, a first channel is selected from an opposing end of a list of shorter-length channels at processing block 320. In the exemplary embodiment of the methodology illustrated, the first channel of the shorter-length code is selected by searching from the bottom of a list of channel codes.

At decision block 330, a determination is made of the assignability of the selected channel by checking the availability of the longer-length channels that depend from the selected channel. In this illustrated embodiment of the invention in operation in a 3G1X wireless system, longer-length channel codes of, for example, length 64 and 128, respectively, depending from a selected shorter-length channel of length 32 are checked for availability.

When any dependent longer-length channel code is determined to be unavailable, the selected shorter-length channel code is not assignable and the next shorter-length channel code is selected at processing block 360. The ability to assign this selected channel is then determined by again checking the availability of dependent longer-length channel codes at decision block 330.

When all the dependent longer-length channel codes are determined to be available, then the selected shorter-length channel is assigned to the user, at processing block 340. The selected shorter-length channel code and all longer-length channel codes that are dependent from the shorter-length channel are then marked as unavailable at processing block 350.

In another embodiment of the invention, channel code availability may be maintained by a single availability indicator field associated with each of the channels of the longest-length channel codes. For example, in a 3G3X system of code sequence length of 256, one single structure of 256 entries, one for each channel, may be used to maintain an indication of the channel availability. In this embodiment, only the longest-length entries are marked as being unavailable. Accordingly, when a shorter-length channel code of $W_{16}$, for example, is proposed for assignment, then those channels of the longest-length (i.e., $W_{256}$) that depend from the proposed shorter-length channel code are checked for availability. If any of the dependent $W_{256}$ channels are unavailable, then the proposed $W_{16}$ channel is also unavailable for assignment. If the dependent $W_{256}$ channel codes are available, then the shorter-length channel code is assigned to the user and the dependent $W_{256}$ channel codes are marked as unavailable.

As would be understood by those skilled in the art, were the wireless system a 3G1X system then the longest-length code sequence is of order 128 and only 128 channels are checked for availability.

Accordingly, in this embodiment of the invention only one availability structure maintains the availability status of channel codes of different length. Similarly, in this embodiment of the invention, selection of relatively longer-length channel codes is performed by selecting channel codes by progressing from one end of a list of channel codes and selecting shorter-length channel codes by progressing from an opposing end of a list of channel codes. For example, longer-length codes may be selected by progressing from the bottom to the top of a list of channel codes, and shorter-length codes would then be selected by progressing from the top to the bottom of the list of channel codes.

In still another, and the preferred, embodiment of the invention the availability of shorter-length channel code may be determined from the availability of longer-length channels only. In this embodiment, both the selection of a shorter-length code and its availability for assignment is determined from the availability the longest-length codes. In this embodiment of the method of the invention, when codes of the longest length are to be assigned a search is made for an available channel code from a first end of a list of longest-length codes within the system. This available channel code is then assigned and marked as unavailable.

Whenever, a transmission requires the assignment of a shorter-length code of length n, then the longest-length channels codes that contain a shorter length code of length n are determined. This determination may be performed, for example, by truncating the longest-length code to length n. A group of channel codes is then formed from those longest-length channel codes that contain the truncated channel code of length n. The availability of the channel codes within this group is then determined. When each of the longest-length channel codes within this group of channels of truncated channel codes is available for assignment, then the shorter-length code may be assigned to a data transmission. The corresponding longer-length channel codes contained within the group of channels of truncated channel code are then marked as unavailable. FIG. 3 illustrates one implementation of this preferred embodiment of the invention in a proposed 3G3X system having a longest length code of 256-chips per symbol.

In FIG. 3, a check is first made, at decision block 510, to determine the code length selected for transmission. If the code length, n, is not less than a known value, then a determination is made of the specific length to be assigned at decision block 520. If the length is the longest-length channel code in the system, then the first available code is found by progressing, from a first end, through a list of longest-length channel codes at processing block 530. In this illustrated embodiment of the invention, the longest-length codes are selected from the top of a list of longest length codes. The code is assigned to the user at processing block 540 and marked as unavailable at processing block 550.

Returning to decision block 520, if the desired code length is not the longest-length code sequence, then the first available code of longest-length is selected at processing block 560 by progressing through, from a first end, a list of longest-length channel codes. In this illustrated example, the longest-length codes are chosen from the top of the list of longest length codes.

A shorter length code of length, n, may then be determined from the longest length code, for example, by truncating the longest-length code to length n. Numerous methods of determining shorter length codes from longer length codes would be understood by those skilled in the art and need not be discussed in detail herein. One such method is a table-lookup, similar to an expanded Table 1.

A search of longest-length codes that have a common shorter-length code of length n is then made at processing block 580. A check of the availability of all the longest-length codes containing the common shorter-length code is then made at decision block 590. If any of the longest-length codes are unavailable for assignment, then the shorter-length code is also unavailable for assignment. Accordingly, a next available longest length code is chosen at processing block 620 and the search process in processing block 580 and the availability check of decision block 590 are repeated. If all the longest-length codes having a common shorter-length code of length n are available, then this common shorter length code is assigned to the user at block 600 and the longest-length codes that contain this common shorter-length code are marked as unavailable at block 610.

Returning to decision block 510, if the channel code length is less than a known length, then the first available channel code is selected at processing block 630 by progressing through a of list of longest-length channel codes from a second end of a list of longest-length channel codes. In this illustrated example, the selection of channel codes of less than a known value is performed from the bottom of a list of longest-length channel codes.

A search of longest-length codes that have a common shorter-length code of length n is then made at processing block 650. A check of the availability of all the longest-length codes containing the common shorter-length code is then made at decision block 660. If any of the longest-length codes are unavailable for assignment, then the shorter-length code is also unavailable for assignment. Accordingly, a next available longest-length code is selected at processing block 690 and the search process of processing block 650 and the availability check of decision block 690 are repeated. If all the longest-length codes having the common shorter-length code are available, then the shorter length code is assigned to the user at block 670 and the longest-length codes that contain the common shorter-length code are marked as unavailable at block 680.

As would be understood, assigning high order channel codes from top to bottom and low order channel codes from bottom to top, as in the illustrated examples is advantageous. In this management of the channel code assignment, minimal constraints in assigning channel codes of shorter length exist with regard to conflicts and channel code availability. Further, transmissions requiring longer-length channel codes are grouped together with channel codes at one end of a list of channel codes and shorter-length channel codes are grouped with channel codes in the opposing end of a list of channel codes. Accordingly, a larger number of channel codes remain grouped together in the center of a list of channel codes to accommodate the assignment of short length channel codes.

In still another embodiment of the invention, channels may be pre-set to be unassignable to carry user voice or data traffic. In accordance with the method of the invention, channels may be a priori set to not carry user traffic by specifying a channel code of the longest-length as unavailable. Accordingly, the method of the invention is thus comparable with current IS-95 standards as the reserved Synch, Pilot and Paging channels may be maintained as unavailable by pre-setting the appropriate channel code indicator. In yet another embodiment of the invention, the reserved channels for Synch, Pilot and Paging channels may be specified in a single reserved channel. For example, channel 16 of a 3G3X ($W_{256}$) or a 3G1X ($W_{128}$) system may be used as a fixed channel. This fixed channel may contain information as to which channels are used for Synch, Pilot and Paging channels. In this manner, selection of pre-assigned Synch, Pilot and Paging channels may be performed dynamically and as needs and requirements change.

The present invention provides a novel method of dynamically assigning channel codes of different length in response to a mixed voice and high data rate transmission environment of the next generation wireless communication systems. Further, the invention provides for the pre-assigning of channels associated with the overhead processing of wireless communication systems. This flexibility in the pre-assignment of channels in accordance with the method of the invention provides designers with the freedom to assign channels dynamically to adapt to changing requirements.

Those skilled in the art will recognize that there are many configurations of wireless systems not specifically described herein but for which the methodology of the invention may be applied. Although the invention is described in various illustrative embodiments, there is no intent to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The management of the channel assignment in accordance with the method of the invention can also be utilized on any system that assigns elements of differing lengths that are dependently related and must prevent conflicts in the assignment.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that of limitation. Details of the structure may be varied substantially without departing from the spirit of the invention and the exclusive use of all modifications which come within the scope of the appended claims is reserved.

What is claimed is:

1. In a wireless communication system, a method of dynamically assigning channel codes from a plurality of channel codes of different lengths comprising the steps of:
   selecting a channel code from a plurality of channel codes of length, n; and
   selecting said channel code using a first progression if said channel code length n is one of a known plurality of channel code lengths; and
   selecting said channel code using a second progression if said code sequence length n is not one of said known plurality of channel code lengths; and
   assigning said selected channel code of length n when channel codes that depend from said selected channel code are not assigned wherein orthogonality among assigned channel codes of differing lengths is maintained.

2. The method as recited in claim 1 wherein said first progression comprises the step of searching a list of channel codes of length, n, from a first end of said list.

3. The method as recited in claim 1 wherein said first progress comprises the step of searching a list of channel codes of length n from the last list entry assigned.

4. The method as recited in claim 1 wherein said second progression comprises the step of searching a list of channel codes of length n from a second end of said list.

5. The method as recited in claim 1 wherein said second progression comprises the step of searching a list of channel codes of length n from the last list entry assigned.

6. The method as recited in claim 1 wherein said selected channel code of length n is assigned when channel codes of longest length that depend from said selected channel code are not assigned.

7. The method as recited in claim 1 wherein said known plurality of code lengths is composed of a set of code lengths above length 63.

8. The method as recited in claim 1 wherein said known plurality of code lengths is composed of a set of code lengths above 127.

9. The method as recited in claim 1 wherein a plurality of channels are a priori set unavailable for assignment.

10. The method as recited in claim 9 wherein channel code 16 of code order 128 is unavailable for assignment.

11. The method as recited in claim 9 wherein channel code 16 of code order 256 is unavailable for assignment.

12. The method as recited in claim 9 wherein channel codes 0, 16, 32, 64, 96, 128, 160, 192, and 224 of code order 256 are unavailable for assignment.

13. The method as recited in claim 12 wherein channel codes 0, 16, 32, 48, 64, 80, 96, and 112 of code order 128 are unavailable for assignment.

14. In a wireless communication system, a method of dynamically assigning channel codes from a plurality of channel codes of different lengths comprising the steps of:
   selecting a channel code from a plurality of channel codes of length n; and
   assigning said selected channel code of length n when channel codes that depend from said selected channel code are not assigned wherein orthogonality among assigned channel codes of differing lengths is maintained, wherein said channel codes are arranged in an ordered list in accordance with $W_{2^n}[j] \rightarrow W_{2^{n+1}}[j]$ and $W_{2^{n+1}}[j+2^n]$ wherein W is a Walsh function of block length 2;
   n is code length of order n; and
   j is an individual element of code length of order n.

15. In a wireless communication system, a method of dynamically assigning channel codes from a plurality of channel codes of different lengths comprising the steps of:
   selecting a channel code from a plurality of channel codes of length, n; and
   determining said channel code using a first progression if said channel code length n is one of a known plurality of code lengths; and
   determining said channel code using a second progression if said channel code length n is not one of said known plurality of code lengths; and
   assigning said determined channel code of length n when the longest length channel codes that depend from said selected code sequence are not assigned wherein orthogonality among assigned channel codes of differing lengths is maintained.

16. The method as recited in claim 15 wherein said first progression comprises the step of searching a list of channel codes of longest-length from a first end of said list.

17. The method as recited in claim 15 wherein said second progression comprises the step of searching a list of channel codes of longest-length from a second end of said list.

18. The method as recited in claim 15 wherein the step of determining a channel code of length n is further comprised of determining the availability of a set of longest-length channel codes wherein said set of longest-length channel codes contain common values of shorter-length n.

19. The method as recited in claim 18 wherein said set of longest-length channel codes is of order 256.

20. The method as recited in claim 18 wherein said set of longest-length channel codes is of order 128.

21. The method as recited in claim 15 wherein said known plurality of code lengths is composed of a set of code lengths above 63.

22. The method as recited in claim 15 wherein said known plurality of code lengths is composed of a set of code lengths above 127.

23. The method as recited in claim 15 wherein a plurality of channels are a priori set unavailable for assignment.

24. The method as recited in claim 23 wherein channel code 16 of code order 128 is unavailable for assignment.

25. The method as recited in claim 23 wherein channel code 16 of code order 256 is unavailable for assignment.

26. The method as recited in claim 23 wherein channel codes 0, 16, 32, 64, 96, 128, 160, 192, and 224 of code order 256 are unavailable for assignment.

27. The method as recited in claim 23 wherein channel codes 0, 16, 32, 48, 64, 80, 96, and 112 of code order 128 are unavailable for assignment.

28. In a wireless communication system, a method of dynamically assigning channel codes from a plurality of channel codes of different lengths comprising the steps of:

determining a channel code of length n; and assigning said determined channel code of length n when the longest length channel codes that depend from said selected code sequence are not assigned wherein orthogonality among assigned channel codes of differing lengths is maintained, wherein said channel codes are arranged in an ordered list in accordance with $$W_{2^n}[j] \rightarrow W_{2^{n+1}}[j] \text{ and } W_{2^{n+1}}[j+2^n]$$

wherein W is a Walsh function of block length 2;

n is code length of order n; and j is an individual element of code length of order n.

\* \* \* \* \*